(12) United States Patent
Chen

(10) Patent No.: US 8,038,322 B2
(45) Date of Patent: Oct. 18, 2011

(54) TUBULAR LED LIGHTING DEVICE

(75) Inventor: Zonglie Chen, Beijing (CN)

(73) Assignee: Yancheng Haomai Lighting Science & Technology Co., Ltd., Yancheng (CN)

( * ) Notice: Subject to any disclaimer, the term of this patent is extended or adjusted under 35 U.S.C. 154(b) by 0 days.

(21) Appl. No.: 12/910,180

(22) Filed: Oct. 22, 2010

(65) Prior Publication Data

US 2011/0038146 A1 Feb. 17, 2011

Related U.S. Application Data

(63) Continuation of application No. PCT/CN2009/000279, filed on Mar. 16, 2009.

(51) Int. Cl.
*F21V 33/00* (2006.01)

(52) U.S. Cl. .............. 362/249.02; 362/311.02; 362/263; 362/247

(58) Field of Classification Search .................. 362/263, 362/249.02, 247, 235, 249.01, 311.02, 311.03, 362/311.05, 800
See application file for complete search history.

(56) References Cited

U.S. PATENT DOCUMENTS

| | | | |
|---|---|---|---|
| 7,476,004 B2 | 1/2009 | Chan | |
| 7,887,226 B2 * | 2/2011 | Huang et al. | 362/581 |
| 2002/0114155 A1 * | 8/2002 | Katogi et al. | 362/219 |
| 2007/0025119 A1 | 2/2007 | Chang-Jien et al. | |
| 2007/0217209 A1 | 9/2007 | Wong | |
| 2007/0242466 A1 | 10/2007 | Wu et al. | |
| 2008/0037245 A1 | 2/2008 | Chan | |
| 2010/0067230 A1 * | 3/2010 | Uang et al. | 362/249.02 |
| 2010/0157600 A1 * | 6/2010 | Chiang | 362/249.02 |

FOREIGN PATENT DOCUMENTS

| | | |
|---|---|---|
| CN | 2766345 Y | 3/2006 |
| EP | 1 162 400 A2 | 12/2001 |
| JP | 2006-12859 A | 1/2006 |

OTHER PUBLICATIONS

International Search Report dated May 14, 2009, PCT/CN2009/000279, filed Mar. 16, 2009.
Chinese Office Action issued Apr. 2, 2010 in Chinese application No. 2008100935558.3 (without translation), 4 pages.
Chinese Office Action issued Sep. 13, 2010 in Chinese application No. 2008100935558.3 (without translation), 4 pages.
Notification of Granted Patent Right issued Apr. 27, 2011 in Chinese application No. 2008100935558.3 (without translation), 2 pages.

* cited by examiner

*Primary Examiner* — Laura Tso
(74) *Attorney, Agent, or Firm* — Brinks Hofer Gilson & Lione

(57) ABSTRACT

A tube elementary LED includes an elementary glass tube through which light can be transmitted and includes two sealed ends respectively provided with a power plug and a power socket and a LED light emitting base plate disposed in the tube that is powered by the power plug and the power socket. A plurality of LED chips for emitting light are mounted on one surface of the LED light emitting base plate and supports fix the LED light emitting base plates in the chamber of the elementary glass tube. The tube elementary LED may include a reflector attached on an internal surface or an external surface of the elementary glass tube to reflect the light emitted from the LED light emitting base plate to outside of the elementary glass tube.

19 Claims, 11 Drawing Sheets

4

4'

TUBULAR LED LIGHTING DEVICE

PRIORITY

This application is a Continuation of PCT/CN2009/000279, entitled "TUBULAR LED LIGHTING DEVICE" and filed on Mar. 16, 2009, which claims priority to Chinese Application No. 200810093558.3, entitled "TUBULAR LED LIGHTING DEVICE" and filed on Apr. 24, 2008, each of which are hereby incorporated by reference.

FIELD OF THE APPLICATION

The present application relates to light-emitting diode ("LED") illuminations, particularly to LEDs and illumination devices comprising the LEDs.

BACKGROUND

LED photonics is a key problem of the stationary illumination technology. Light emitted from an active layer of LED is liberated into the environment via a complicated path in the LED chip, and some photon will be lost due to absorption at every travel step through the substrate, the semiconductor layer, the electrode and the resin cap. A general method currently used in high-brightness LED is to employ a thick transparent substrate and increase the number of pyramids for photon liberation; in a rectangular configuration, up to six pyramids are opened; or simply eliminate the absorptive substrate so as to improve the efficiency of the photo liberation. Typical thickness of the active layer in the high-brightness LED is in a range of 0.3-1 µm, the thickness of the active layer can further be decreased to 0.3 µm or less, and a heterostructure for multiquantum-well is introduced to improve the LED performance. In some cases, the external quantum efficiency may only reach 20% and it may be difficult to solve the problem of heat dissipation at joints in high power stationary white-light illumination chip. Many heat-sink devices currently used may be made from metal, resulting in compatibility problems of light extraction with good heat conduction and heat dissipation. The compatibility of LED's, as a white-light illuminator, with the mode employed by ordinary light source may not have been considered, including the compatibility and interchangeability of LED's with conventional tube fluorescent lamps.

SUMMARY

The present application provides a tube elementary light emitting diode ("LED"). A tube elementary LED, comprises an elementary glass tube, through which light can be transmitted and has two sealed ends provided with a power plug and a power socket respectively; at least one LED light emitting base plate disposed in the elementary glass tube, which is powered by the power plug and the power socket, a plurality of LED chips for emitting light are mounted on one surface of the LED light emitting base plate; and a plurality of affixing supports affixing the at least one LED light emitting base plate in an internal chamber of the elementary glass tube.

The tube elementary LED further comprises a reflector attached on an internal surface or an external surface of the elementary glass tube so as to reflect light emitted from the at least one LED light emitting base plate to outside of the elementary glass tube.

In the tube elementary LED, the elementary glass tube is one of a polycrystalline alumina tube, a quartz glass tube, a Vycor glass tube, a borosilicate glass tube, a microcrystalline glass tube and an ordinary soda lime glass tube.

In the tube elementary LED, the power plug and the power socket are complimentary to each other, such that two or more of the tube elementary LEDs can be connected to each other through the power plug and the power socket.

In the tube elementary LED, the power plug and the power socket are one-pin plug and one-pin socket complimentary to each other, or double-pin plug and double-pin socket complimentary to each other.

In the tube elementary LED, the elementary glass tube is shaped as one of cylinder, arc-shaped cylinder, elliptical cylinder, arc-shaped elliptical cylinder, prism and arc-shaped prism.

In the tube elementary LED, the elementary glass tube has a diameter in the range of 0.5 mm-26.5 mm, a wall thickness in the range of 0.15 mm-1.5 mm, and a length in the range of 7 mm-480 mm.

In the tube elementary LED, the LED light emitting base plate has a length in the range of 6 mm-470 mm, a width in the range of 0.25 mm-24 mm, and a thickness in the range of 0.1 mm-1.5 mm.

In the tube elementary LED, the LED light emitting base plate is made of a semitransparent polycrystalline alumina plate or a quartz glass plate.

In the tube elementary LED, the LED chips are microcrystalline LED chips.

In the tube elementary LED, the microcrystalline LED chips have a diameter in the range of 10 µm-50 µm.

In the tube elementary LED, the reflector is a film metal reflector coated on the internal surface or the external surface of the tube wall of the elementary glass tube, or a plate metal reflector embedded on the internal surface or the external surface of the tube wall of the elementary glass tube, or a dielectric film.

In the tube elementary LED, the metal reflector is made of aluminum; the dielectric film is made of zinc sulfide and magnesium fluoride, or made of silicon monoxide and magnesium fluoride.

In the tube elementary LED, half of the internal surface or half of the external surface of the elementary glass tube is attached with the reflector.

In the tube elementary LED, the reflector comprises two comb-like metal parts which are inserted into each other and are electrically insulated from each other.

In the tube elementary LED, the tube elementary LED comprises two LED light emitting base plates.

In the tube elementary LED, the two LED light emitting base plates are disposed symmetrically along an axis of the elementary glass tube, an angle between two planes, which respectively extend from two surfaces of the two LED light emitting base plates on which the LED chips are mounted, is higher than 90 degrees.

In the tube elementary LED, the tube elementary LED comprises three LED light emitting base plates.

In the tube elementary LED, respective planes of the three LED light emitting base plates are intersected to form a triangular prism, and respective surfaces of the three LED light emitting base plates, on which the LED chips are mounted, are external surfaces of the triangular prism.

In the tube elementary LED, out of the three LED light emitting base plates, every two LED light emitting base plates are symmetrical with respect to the plane of the third LED light emitting base plate.

In the tube elementary LED, the plurality of affixing supports are made of metal.

In the tube elementary LED, the plurality of affixing supports are made of surface-polished aluminum.

In the tube elementary LED, the elementary glass tube is filled with dry nitrogen or an inert gas at a pressure range of 100 Torr-3 atm.

In the tube elementary LED of the present application, heat is generated when the LED chips on the LED light emitting base plate operate, and a portion of the heat is conducted to the affixing support and the reflector by metal leads; another portion of the heat is dissipated through the good heat conductivity of the PCA plate, through a heat exchange with high-intensity nitrogen or inert gas within the elementary glass tube to generate convection, with the reflector, the affixing support and the tube wall of the elementary glass tube, and finally passes through the tube wall for dissipating to atmosphere outside of the elementary glass tube. In addition, transparency of the elementary tube also increases permeability of radiant heat. Therefore, since in the tube elementary LED according to the present application heat conductivity, heat exchange, heat dissipation, photon liberation are considered, not only the internal quantum efficiency of the chips is increased, but also the external quantum efficiency is increased by 200%; a input power of one tube elementary LED is increased from existing high power white light LED of 3-5 W to a maximum power of 15-20 W.

Moreover, a plurality of the tube elementary LEDs according to the present application can be connected together to form a lamp tube. The lamp tube can be used in a mode of an ordinary illumination light source, and especially well compatible and interchangeable with conventional tube fluorescent lamps used for a large area.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 2b shows respective planes of the three LED light emitting base plates are intersected to form a triangular prism with reference to the embodiment of FIG. 2a.

FIG. 2c shows two of the LED light emitting base plates are symmetrical with respect to the plane of the third LED light emitting base plate with reference to the embodiment of FIG. 2a.

DETAILED DESCRIPTION

Embodiments of the present application will be described below with reference to the Figures, in which the same component is represented with the same reference sign.

First Embodiment

A tube elementary LED according to an embodiment is a white-light LED with high power and high irradiance. A structure thereof will be described below with reference to the Figures.

Figure 1:
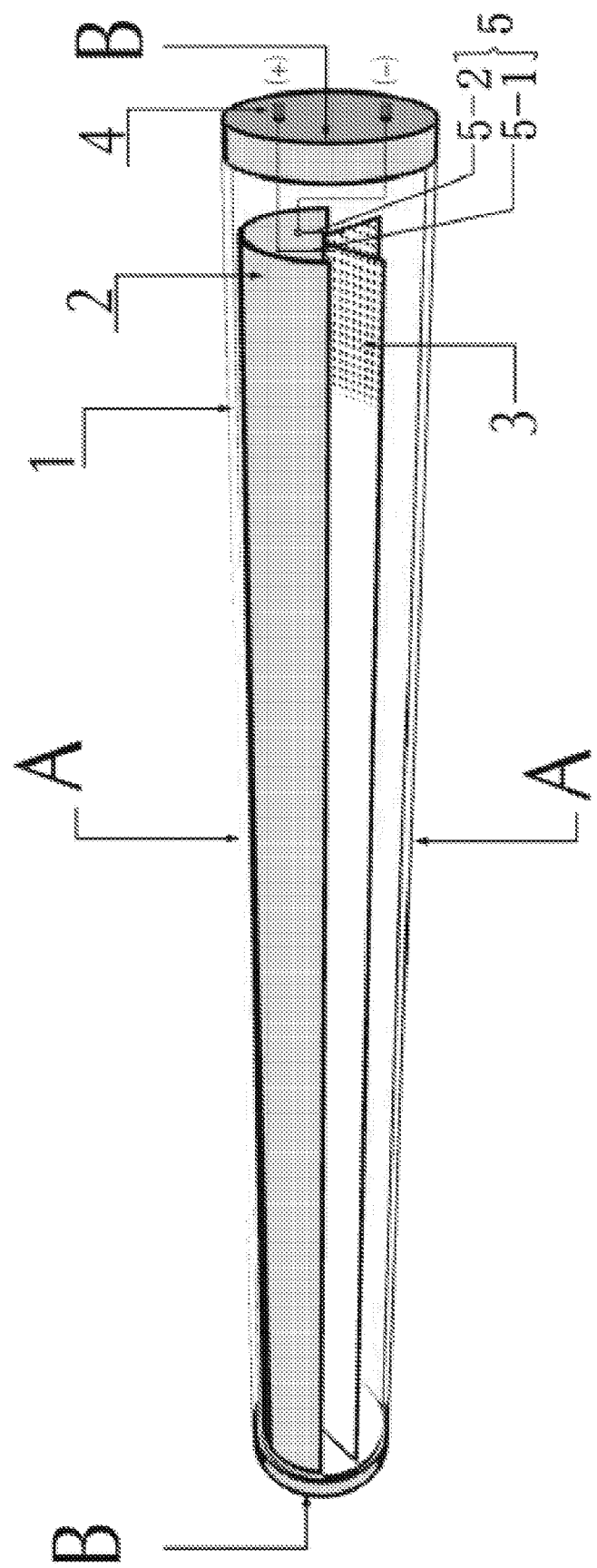
FIG. 1 is a prospective view of a tube elementary LED according to a first embodiment.
Figure 2A:
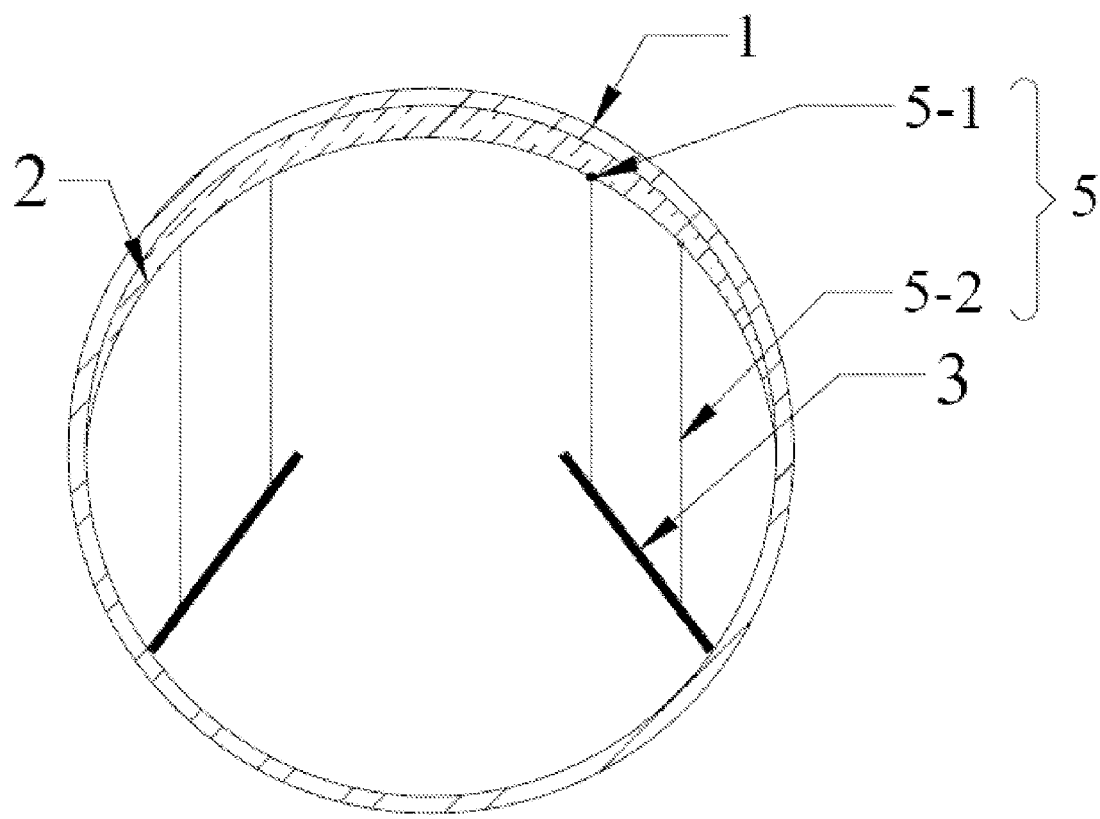
FIG. 2a is a cross-sectional view of the tube elementary LED according to the first embodiment along the Line A-A in FIG. 1.
Figure 2B:
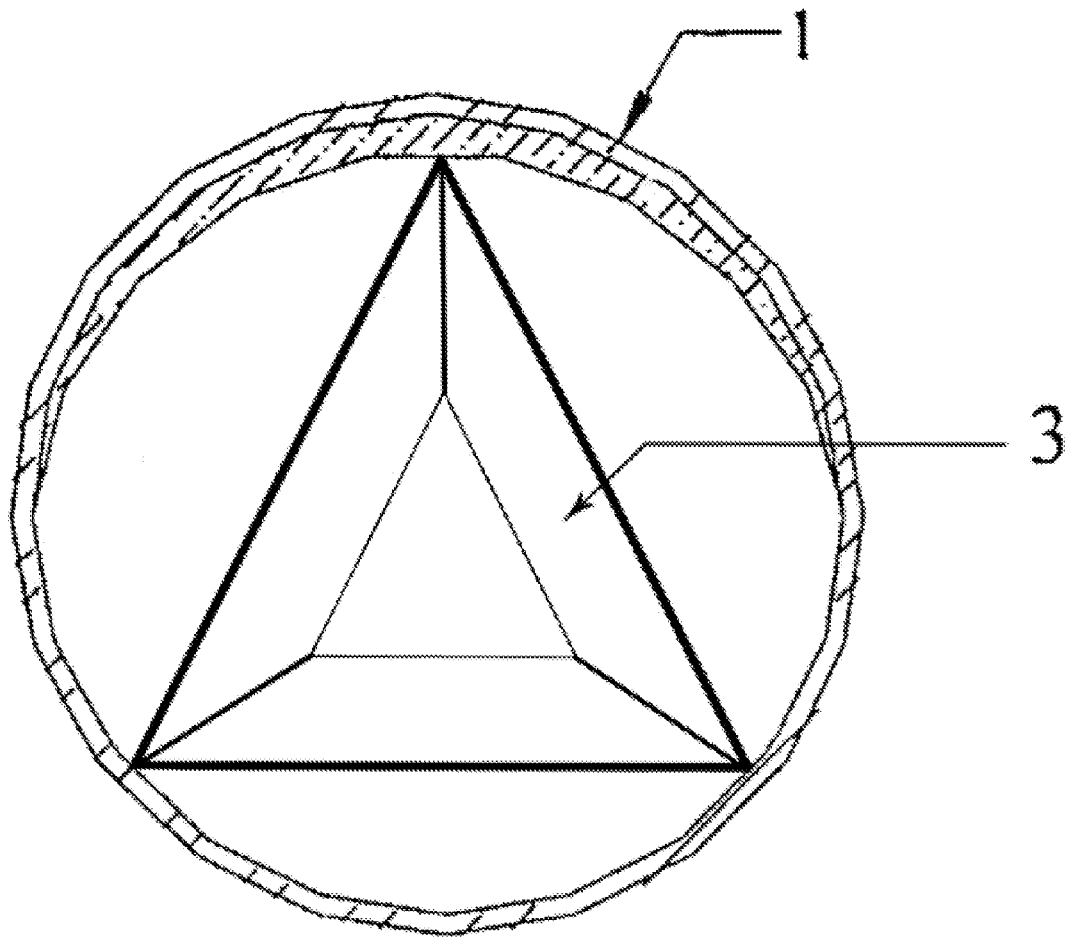
Figure 2C:
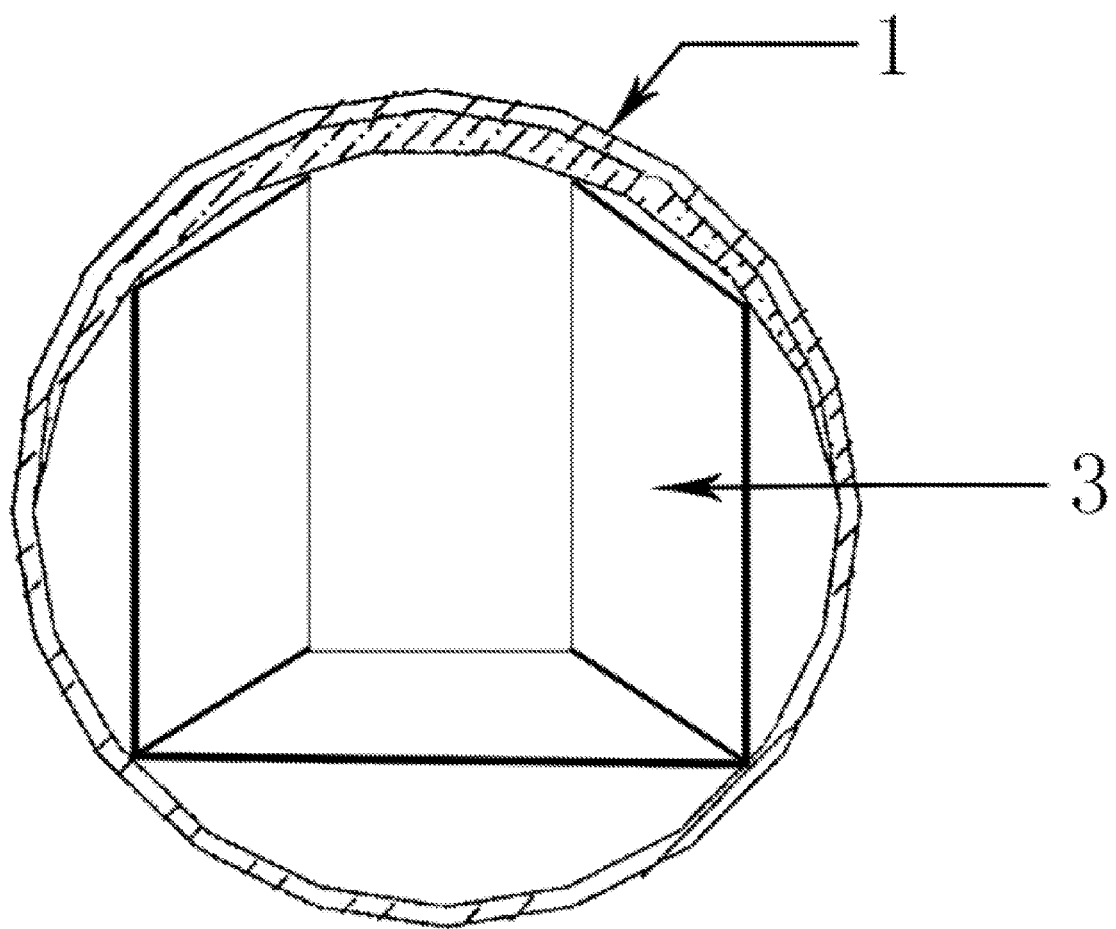
Figure 3:
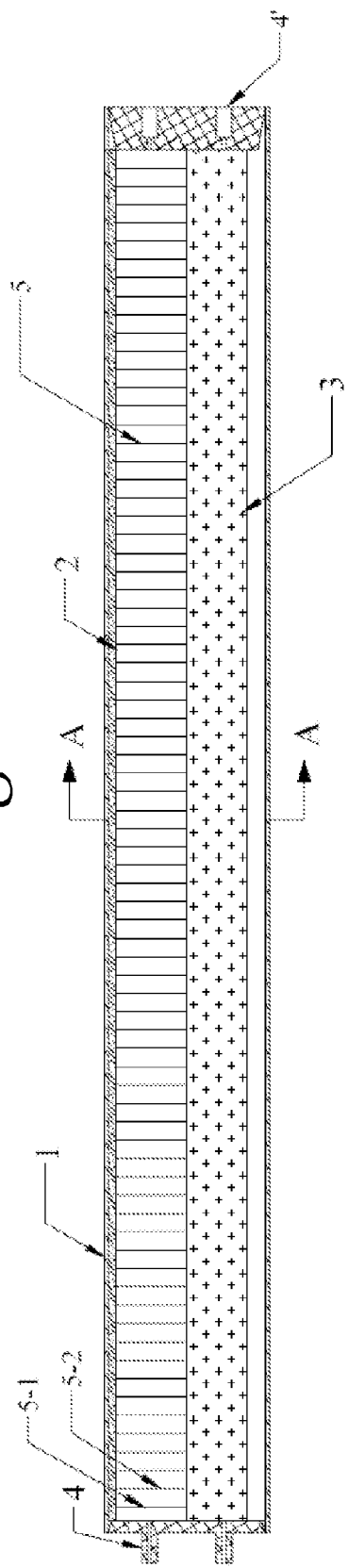
FIG. 3 is a cross-sectional view of the tube elementary LED according to the first embodiment along the Line B-B in FIG. 1.

FIG. 1 is a prospective view of a tube elementary LED according to a first embodiment. FIGS. 2a-c show a cross-sectional view of the tube elementary LED according to the first embodiment along the Line A-A in FIG. 1. FIG. 3 is a cross-sectional view of the tube elementary LED according to the first embodiment along the Line B-B in FIG. 1.

As shown in FIGS. 2a and 3, the tube elementary LED comprises an elementary glass tube 1, a reflector 2, a LED light emitting base plate 3, a power plug 4, a power socket 4', and a plurality of affixing supports 5.

As shown in FIGS. 2 and 3, the tube elementary LED comprises an elementary glass tube 1, a reflector 2, a LED light emitting base plate 3, a power plug 4, a power socket 4', and a plurality of affixing supports 5.

In particular, the elementary glass tube 1 is made of a semitransparent polycrystalline alumina (PCA) tube, a quartz glass tube, a Vycor glass tube, a borosilicate glass tube, a microcrystalline glass tube or an ordinary soda lime glass tube. For example, the elementary glass tube 1 preferably has a diameter of 0.5 mm-26.5 mm, a wall thickness of 0.15 mm-1.5 mm, and a length of 7 mm-480 mm; an inner circle and ends thereof (two ends of the inner circle are polished to taper-shaped ports) are grinded and polished to meet geometry norms, and made appear clean and bright.

The tube elementary LED according to the present application further comprises a reflector 2 for reflecting light emitted from the LED light emitting base plate 3.

The reflector 2 for reflecting light emitted from the LED light emitting base plate 3 will be described below with respect to FIGS. 7 and 8.

Figure 7:
FIG. 7 is a cross-sectional view of a reflector of the tube elementary LED according to the first embodiment along the Line B-B in FIG. 1.

FIG. 7 is a cross-sectional view of a reflector of the tube elementary LED according to the first embodiment along the Line B-B in FIG. 1. FIG. 8 is a cross-sectional view of the reflector of the tube elementary LED according to the first embodiment along the Line A-A in FIG. 1.

Figure 8:
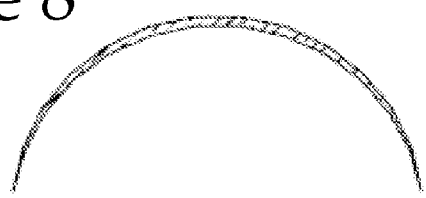
FIG. 8 is a cross-sectional view of the reflector of the tube elementary LED according to the first embodiment along the Line A-A in FIG. 1.

As shown in FIG. 8, in a preferable embodiment, the reflector 2 is an aluminum (other metal which has a good reflecting characteristic can also be used, for example, silver) reflecting layer coated on a certain area of the internal wall of the elementary glass tube 1, and may be a metal reflector made of a metal plate embedded on an internal wall of the elementary glass tube 1.

In addition, a dielectric film can be plated on a particular area of the internal wall of the elementary glass tube 1, and the dielectric film can reflect visible light and transmit infrared light. For example, the dielectric film can be a film made of zinc sulfide and magnesium fluoride or can be a film made of silicon monoxide and magnesium fluoride.

The reflector 2 can reflect light emitted from the LED light emitting base plate 3. Therefore, the reflector 2 is preferably disposed on half of the cylinder surface of the internal wall of the elementary tube 1 so as to achieve a good reflection effect. Of course, the reflector 2 can also be disposed on the external wall of the elementary glass tube 1, and the reflection effect to be achieved is the same as the reflector 2 disposed on the internal wall of the elementary glass tube 1.

In addition, the metal reflector made of the metal plate is attached to the internal wall of the elementary tube 1 so as to achieve good heat conductivity.

Figure 9:
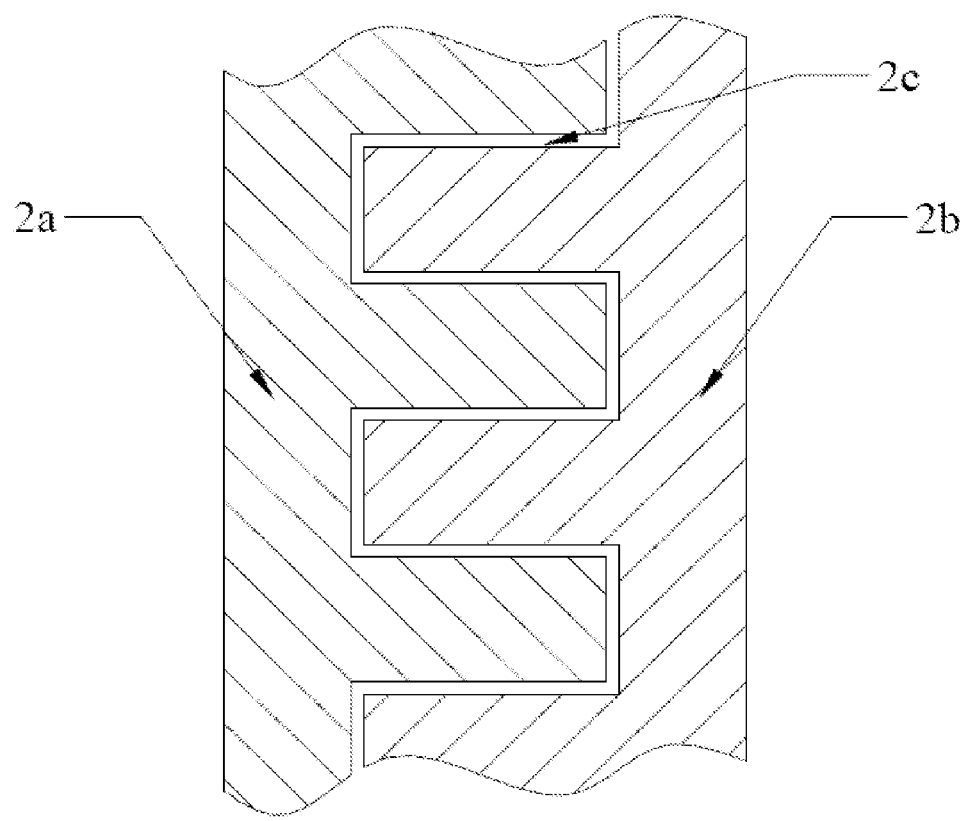
FIG. 9 is a schematic view of a reflector, which is formed from two parts, of the tube elementary LED.

Of course, although FIGS. 7 and 8 only show the integrally formed reflector 2, in consideration for an optimal heat dissipation effect at the PN junctions of the LED chips, the metal reflector 2 made of the metal plate can be designed as two pieces of comb-like parts in the direction of the B-B axis, both of which have many convexes and concaves, the convexes of one piece of comb-like part are almost inserted into the corresponding concaves of the other piece of comb-like part. FIG. 9 is a schematic view of a reflector 2, which is made up of two parts, of the tube elementary LED according to the present application. Thus, the reflector can be divided into two parts in terms of the function of conducting electricity.

It should be noted that the reflector 2 is not absolutely necessary for the tube elementary LED. Since three or more LED light emitting base plates 3 can be used in the tube elementary LED for achieving uniform luminous flux around the tube elementary LED, the reflector 2 may not be required.

The LED light emitting base plate 3 will be described in detail below with reference to FIGS. 4 and 5.

Figure 4:
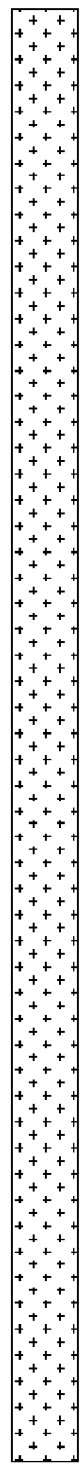
FIG. 4 is a schematic view of a LED light emitting base plate of the tube elementary LED according to the first embodiment.

FIG. 4 is a schematic view of the LED light emitting base plate of the tube elementary LED according to the first embodiment. FIG. 5 is an enlarged view of the LED light emitting base plate of the tube elementary LED according to the first embodiment.

As shown in FIG. 4, the LED light emitting base plate 3 is shaped as a strip, and is made of a semitransparent PCA alumina plate or a silica glass plate 3-1 with high heat conductivity. For example, the strip-shaped LED light emitting base plate 3 can be preferably made by pressing and sintering semitransparent PCA alumina which is 6 mm-470 mm long, 0.25 mm-24 mm wide and 0.1 mm-1.5 mm thick, or by pressing fused quartz glass with similar dimensions.

Figure 5:
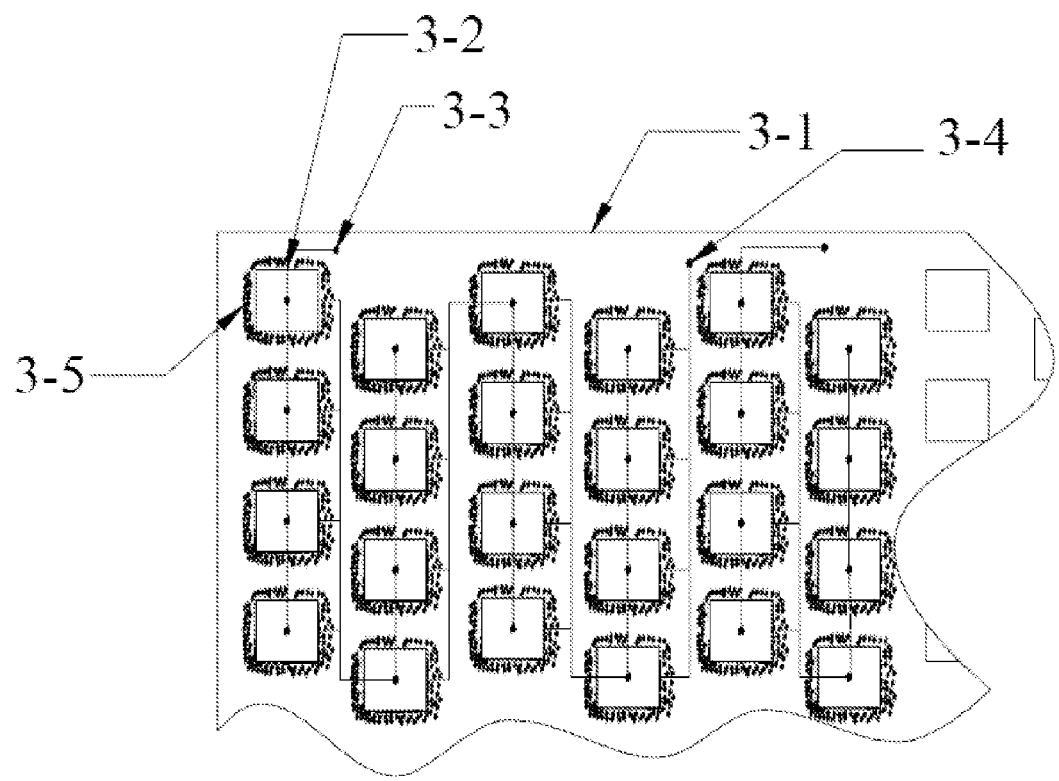
FIG. 5 is an enlarged view of the LED light emitting base plate of the tube elementary LED according to the first embodiment.

As shown in FIG. 5, N LED chips 3-2 are integrally mounted on one surface of the LED light emitting base plate 3, and the body of the chip is made from a microcrystalline LED chip of AlInGaN system for blue light. The PN junctions of the LED chips 3-2 are first connected in series respectively and then connected in parallel by leads, so as to form an anode lead terminal 3-3 and a cathode lead terminal 3-4. For example, on the LED light-emitting base plate 3, the microcrystalline chips can be disposed in a manner such that every N (N>1) microcrystalline chips are connected in parallel into a group and every four such groups are connected in series.

The LED light emitting base plate 3 further has an appropriate combination of two ionic phosphors 3-5 with broadband emissions: SrGa2S4: Eu2+SrS: Eu2. The former ionic phosphor converts blue light to green light of 535 nm; the latter one converts blue light into red light of 615 nm. When a chip emitting green light and a chip emitting red light are combined appropriately, a high color rendering index Ra can be achieved, and can reach the highest of 99. Preferably, the LED light emitting base plate 3 is a PCA alumina plate which can transmit more than 95 percent of visible light.

Of course, as can be understood by the skilled person in the art, the LED chips can be chips emitting light of any color with an appropriate dimension, and the phosphors can be other combinations.

At least one LED light emitting base plate 3 is disposed in the tube elementary LED according to the present application. As shown in FIG. 2a-c, two LED light emitting base plate 3 are disposed in the elementary glass tube 1. Preferably, the two LED light emitting base plates 3 are disposed symmetrically along the axis of the elementary glass tube 1, an angle is formed between two planes extending on two corresponding surface of the two LED light emitting base plates 3 on which the LED chips are mounted, and the angle is preferably higher than 90 degrees.

In addition, the two LED light emitting base plates 3 as shown in FIG. 2a are only an example. In one example not shown in the figures, only one LED light emitting base plate may be disposed in the elementary glass tube 1. In another example not shown in the figures, three LED light emitting base plates 3 may be disposed in the elementary glass tube 1. The three LED light emitting base plates can be disposed in any manner.

In one preferable embodiment, respective planes of the three LED light emitting base plates are intersected to form a triangular prism, and respective surfaces of the three LED light emitting base plates, on which the LED chips are mounted, are on external surfaces of the triangular prism.

In another preferable embodiment, every two LED light emitting base plates are symmetrical with respect to the plane of the third LED light emitting base plate. The surfaces of three LED light emitting base plates, on which the LED chips are mounted, can face any direction; and it is preferable that the surface of each of the three LED light emitting base plates, on which the LED chips are mounted, faces a surface of the adjacent LED light emitting base plate, on which the LED chips are not mounted.

Of course, if necessary, four or more LED light emitting base plates can be disposed in the elementary glass tube 1. It should be noted that, in the case that three or more LED light emitting base plates are used, the reflector 2 may not be included in the tube elementary LED.

As shown in FIGS. 2a and 3, the LED light emitting base plate 3 is supported by a plurality of affixing supports 5 with one end fixed on the elementary glass tube 1 or on the reflector 2, and the affixing support 5 can be made of metal and preferably surface-polished aluminum so as to have a good light reflection property. In this embodiment, since the affixing support 5 is made of metal, the affixing support 5 can be used to supply power to the LED light emitting base plate 3. In particular, as shown in FIGS. 2a and 3, the plurality of affixing supports 5 can be divided into a plurality of anode supports 5-1 and a plurality of cathode supports 5-2. In the case that the reflector 2 is made of metal, the anode support 5-1 or the cathode support 5-2 can be connected to the anode or the cathode of the power plug and the power socket of the tube elementary LED through the reflector 2. Since the reflector 2 is unitarily formed, it may only act either as a conductor connecting the anode or as a conductor connecting the cathode.

For example, when the anode support 5-1 is connected to the anode of the power plug and the anode of the power socket through the reflector 2, the cathode support 5-2 is fixed on the internal wall of the elementary glass tube 1, insulated from the reflector 2, and connected to the cathode of the power plug 4 and the cathode of the power socket 4' through a wire insulated from the reflector 2. Simultaneously, the anode support 5-1 and the cathode support 5-2 act as the power leads of the anode lead terminal 3-3 and the cathode lead terminal 3-4, respectively, of the microcrystalline chip on the LED light emitting base plate 3. Of course, in the structure described above, the positive support 5-1 and the negative support 5-2 are interchangeable. That is, the cathode support 5-2 may be connected to the cathode of the power plug 4 and the cathode of the power socket 4' through the reflector 2, while the anode support 5-1 is fixed on the internal wall of the elementary glass tube 1 and is insulated from the reflector 2.

No matter whether it is the anode support 5-1 or the cathode support 5-2 that contacts with the reflector 2, the PN junctions can have a good contact with the metal reflector at many points through the affixing support 5, so as to conduct heat emitted from the PN junctions to the metal reflector 2, which is attached closely to half of the internal wall of the elementary glass tube 1, and dissipate heat through conduction.

Moreover, in another preferable embodiment, as shown in FIG. 9, two comb-like parts 2a and 2b of the reflector 2 are disposed in a manner such that the convex portions of one are complimentary to concave portions of the other, and an insulating interval 2c (may also comprise insulating material) of a minimum insulating distance at a low voltage ($\geq$DC 12V) is maintained between the two pieces of comb-like parts 2a and 2b, so that the comb-like parts 2a and 2b can respectively be connected to the plurality of anode supports 5-1 and the plurality of cathode supports 5-2 of the supports 5 shown in FIG. 1 with a minimum distance between them. Thus, enhanced heat conductivity can be achieved compared with the above manner in which only one of the anode support 5-1 and the cathode support 5-2 is electrically connected to the reflector 2.

The power plug and the power socket at ends of the tube elementary LED according to the first embodiment will be described below with reference to the FIGS. 6A-6C.

Figure 6A:
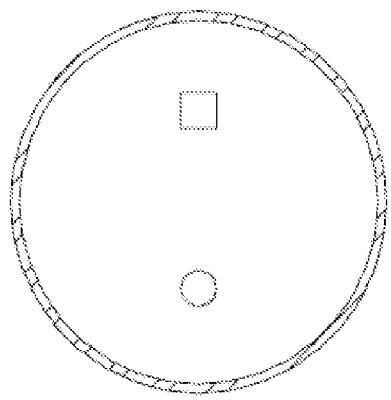
FIG. 6A is a front view of a power plug and a power socket at an end of the tube elementary LED according to the first embodiment.
Figure 6B:
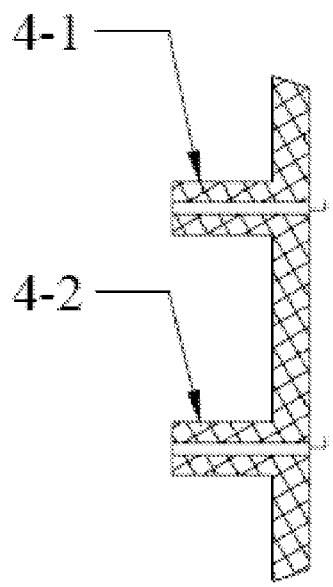
FIG. 6B is a cross-sectional view of the power plugs at one end of the tube elementary LED according to the first embodiment along the Line B-B in FIG. 1.
Figure 6C:
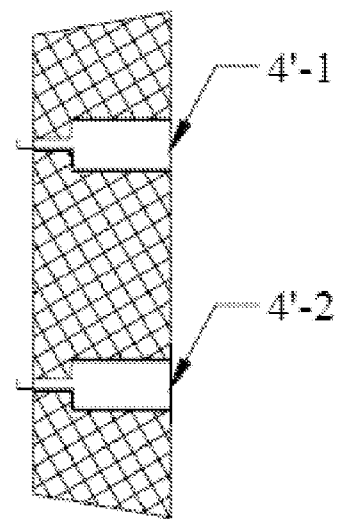
FIG. 6C is a cross-sectional view of the power sockets at the other end of the tube elementary LED according to the first embodiment along the Line B-B in FIG. 1.

FIG. 6A is a front view of a power plug and a power socket at an end of the tube elementary LED according to the first embodiment; FIG. 6B is a cross-sectional view of the power plug at one end of the tube elementary LED according to the first embodiment along the Line B-B in FIG. 1; and FIG. 6C is a cross-sectional view of the power socket at the other end of the tube elementary LED according to the first embodiment along the Line B-B in FIG. 1.

As shown in FIGS. 1 and 2a, two sealed ends of the elementary glass tube 1 are made by pressing and then sintering fused glass material or microcrystalline glass. The two sealed ends are respectively provided with the power plug 4 and the power socket 4', wherein the power plug 4 is a power input, and the power socket 4' is a power output. The power plug 4 and the power socket 4' can be made of any conductive material such as metal. In the preferable embodiment, as shown in FIGS. 6B and 6C, the power plug 4 and the power socket 4' can be concave and convex leading out terminals. The convex end is a double-pin plug, wherein one pin is a rectangular pin 4-1 with a rectangular cross-section, and the other pin is a circular pin 4-2 with a circular cross-section. The concave end is a double-hole socket, wherein one hole is a rectangular hole 4'-1 with a rectangular cross-section, and the other hole is a circular hole 4'-2 with a circular cross-section. It is apparent that the power plug 4 and the power socket 4' can be of any structure adapted to plug into each other apart from the double-pin plug and the double-hole socket. Therefore, the power plug 4 and the power socket 4' with the same matching specification can plug into each other. Two ends of the tube elementary LEDs of the same matching specifications can thus be connected together by plugging into each other to form a tube entirety comprising any desired number of the tube elementary LEDs, which makes it extremely easy for the tube elementary LED to be compatible with luminaires supports of existing tubular fluorescent lamp system.

In the power plug and the power socket of the double-pin and double-hole structure described above, one pin and one hole are positive poles, the other pin and the other hole are negative poles, thereby to power the LED light emitting base plate 3.

In addition, although the double-pin power plug and the double-hole power socket are shown in the Figures, the power plug and the power socket can be a one-pin plug and a one-hole socket. That is, when the one-pin power plug is a positive pole, the one-hole power socket is a negative pole, or when the one-pin power plug is a negative pole, the one-hole power socket is a positive pole.

No matter whether the power plug and the power socket are of a double-pin and double-hole structure or of a one-pin and one-hole structure, when the power plug 4 and the power socket 4' with the same plugging structure plug into each other, they can be connected electrically.

In addition, it is only one example that the cross sections of the pins and the holes are rectangular or circular in the power plug and the power socket described above, the pins and the holes can be of any desired shape as long as it is easy for them to plug into each other.

The case that the LED light emitting base plate 3 is powered by the power plug 4 and the power socket 4' through the affixing supports 5 and the reflector 2 both made from metal is discussed above. The person skilled in the art may construct a circuit loop to power up the LED light emitting base plate 3 by the power plug 4 and the power socket 4' in other manners. As shown in FIG. 1, the power plug 4 and the power socket 4' may be connected with the affixing support 5 made from metal through a wire, so as to power the LED light emitting base plate 3. In addition, the power plug 4 and the power socket 4' may be connected with the affixing support 5 made of metal by placing metal wires or transparent wires on the elementary glass tube 1 or the reflector 2, so as to power up the LED light emitting base plate 3 through the affixing support 5 made of metal. Of course, the power plug 4 and the power socket 4' may be connected to the LED light emitting base plate 3 directly.

Preferably, the power plug 4 and the power socket 4', as well as the ends and the elementary glass tube 1 all employ metallization brazing or gas-tight sealing of low melting glass. Preferably, two steps are carried out in the gas-tight sealing, step 1: the overall device is heated to 150° C. in vacuum to remove water vapor and other gas absorbed in the elementary glass tube 1, and step 2: the elementary glass tube 1 is filled with dry nitrogen or an inert gas (for example, argon, neon etc.) at a pressure in the range of 100 Torr-3 atm. Preferably, nitrogen is filled, since the cost to use nitrogen is lowest in the art. Nitrogen is generally obtained from liquid nitrogen, and such nitrogen is very dry and water vapor content is lower than ten millionths, which can ensure that the water vapor content within the package is lower than 5000 ppm (5‰). Such dew point below 0° C. (6000 ppm, i.e. 6‰) may ensure that any water will condense and exist as ice, which will not cause faults to components and circuits within the elementary glass tube 1 due to liquid water.

The microcrystalline LED chips 3-2 are directly mounted on the LED light emitting base plate 3 made of PCA, which has good heat conductivity and can transmit 95% of visible light, and a portion of heat generated when the LED chips 3-2 operate is conducted by the affixing support 5 and the reflector 2. Another portion of heat is dissipated through the LED light emitting base plate 3 made of PCA which has good heat conductivity, through a heat exchange with high-intensity nitrogen or inert gas within the elementary glass tube 1 to generate convection, with the reflector 2, the affixing support 5 and the tube wall of the elementary glass tube 1, and finally passes through the tube wall for dissipating to atmosphere outside of the elementary glass tube 1. In addition, transparency of the elementary tube 1 also increases permeability of radiant heat.

Such good heat stress release characteristics of the microcrystalline LED chips may lower the dielectric field and improve the internal quantum efficiency of the chips. The microcrystalline LED chips are integrally mounted in an array, which increases the peripheral area around the chips. In addition, since the diameter of the microcrystalline LED chip is only about 10 μm but a side length thereof is up to 40 μm, and compared with a chip whose diameter is several millimeter, a peripheral length of the microcrystalline LED chip has been extended more than a hundred times, thus a good path can be provided for side-liberation of photon in the active layer. Photon generated from the active layer of about 16 μm2 in the peripheral of the microcrystalline LED chip is emitted without any obstacle, since the microcrystalline LED chip with a width smaller than 0.4 μm may be considered as transparent to visible light, and therefore the external quantum efficiency can be increased to almost 200%. Photon escaped in any direction from the multiple microcrystalline LED chips either directly passes through the elementary tube 1 of the tube elementary LED to the space of the outer layer, or is reflected by the reflector 2 in the elementary tube 1 and sent to the space of the outer layer in another direction.

As described above, since heat conductivity, heat exchange, heat dissipation, photon liberation of the LED chips are considered, not only the internal quantum efficiency of the chips is increased, but also the external quantum efficiency is increased by 200%; a input power of one tube elementary LED is increased from existing high power white light LED of 3-5 W to a maximum power of 15-20 W.

Second Embodiment

Figure 10:
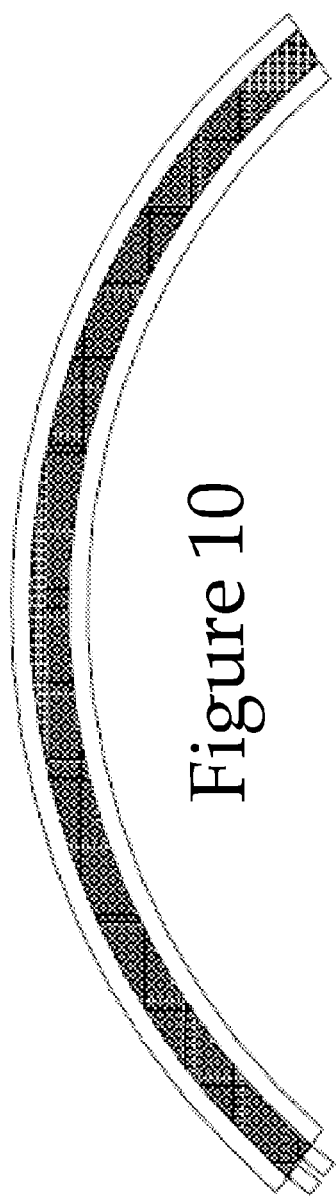
FIG. 10 is a schematic view of a tube elementary LED (an arc-shaped tube elementary LED) according to a second embodiment.

Although the tube elementary LED according to one preferable embodiment has been described above, it should be understood by the person skilled in the art that the tube elementary LED described above can be formed into other shapes. FIG. 10 is a schematic view of a tube elementary LED (an arc-shaped tube elementary LED) according to another embodiment.

In this embodiment, as shown in FIG. 10, the tube elementary LED can be designed as an arc-shaped tube. Except that the elementary glass tube 1, the reflector 2, and the LED light emitting base plate 3 are shaped into arc-shapes, the structure of the arc-shaped tube elementary LED in this embodiment is the same as that in FIGS. 1-3. A central angle of the arc-shaped tube elementary LED may be an angle of any degree, preferably less than 180 degrees.

Apparently, it should be understood by the person skilled in the art that besides the arc-shaped tube elementary LED in this embodiment, the tube elementary LED comprising the elementary glass tube 1, the reflector 2, and the LED light emitting base plate 3 etc. may be formed into any shape, for example, cylinder, arc-shaped cylinder, elliptical cylinder, arc-shaped elliptical cylinder, prism, and arc-shaped prism.

Third Embodiment

A plurality of the tube elementary LEDs can be assembled together to from an illumination device, for example a lamp tube. Examples of lamp tubes constituted by a plurality of the tube elementary LEDs will be described with reference to FIGS. 11 and 12.

Figure 11:
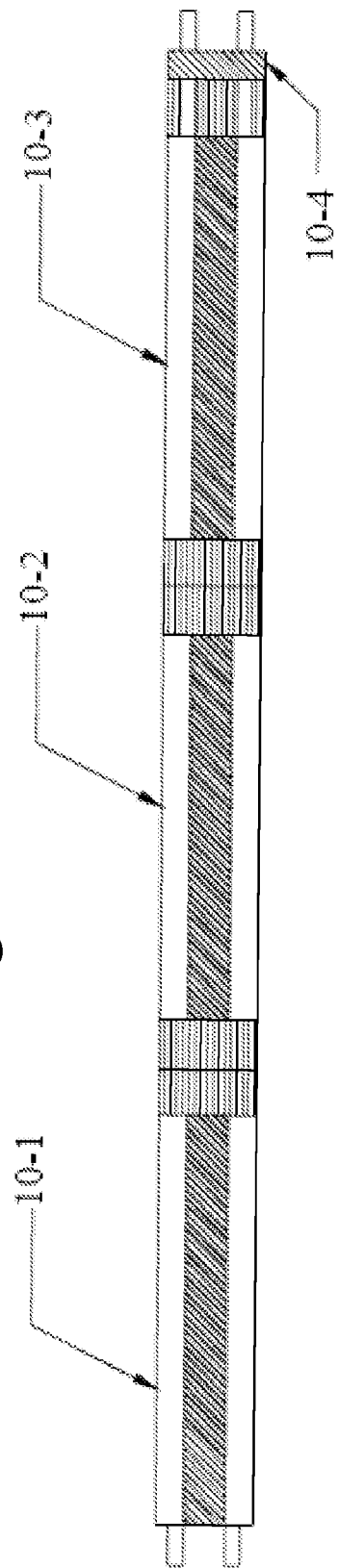
FIG. 11 is a schematic view of one example of an illumination device (a straight lamp tube) constituted by the tube elementary LED according to the first embodiment.

FIG. 11 is a schematic view of one example of an illumination device (a straight lamp tube) constituted by the tube elementary LED according to the first embodiment.

As shown in FIG. 11, the straight lamp tube is constituted by three tube elementary LEDs 10-1 to 10-3 according to the first embodiment. One adapter plug 10-4 is provided at the right end of the straight lamp tube, one end of this adapter plug 10-4 is plugged into a socket of the tube elementary LED 10-3, the other end of this adapter plug 10-4 can be plugged into a socket on one side of a lamp support (not shown), a socket of the tube elementary LED 10-1 can be plugged into a socket on another side of the lamp support. Of course, the adapter plugs can be mounted on both sides of the straight lamp tube, so even when dimensions of an illumination device made up of a plurality of the tube elementary LEDs do not match the dimensions of the lamp support, such illumination device can still be assembled onto the lamp support through the adapter plugs.

It would be understood by the person skilled in the art that the straight lamp tube can comprises any desired number of the tube elementary LEDs according to the first embodiment. Depend on the dimensions of the tube elementary LED, the straight lamp tube can be made to be compatible with existing fluorescent lamp support.

Fourth Embodiment

Figure 12:
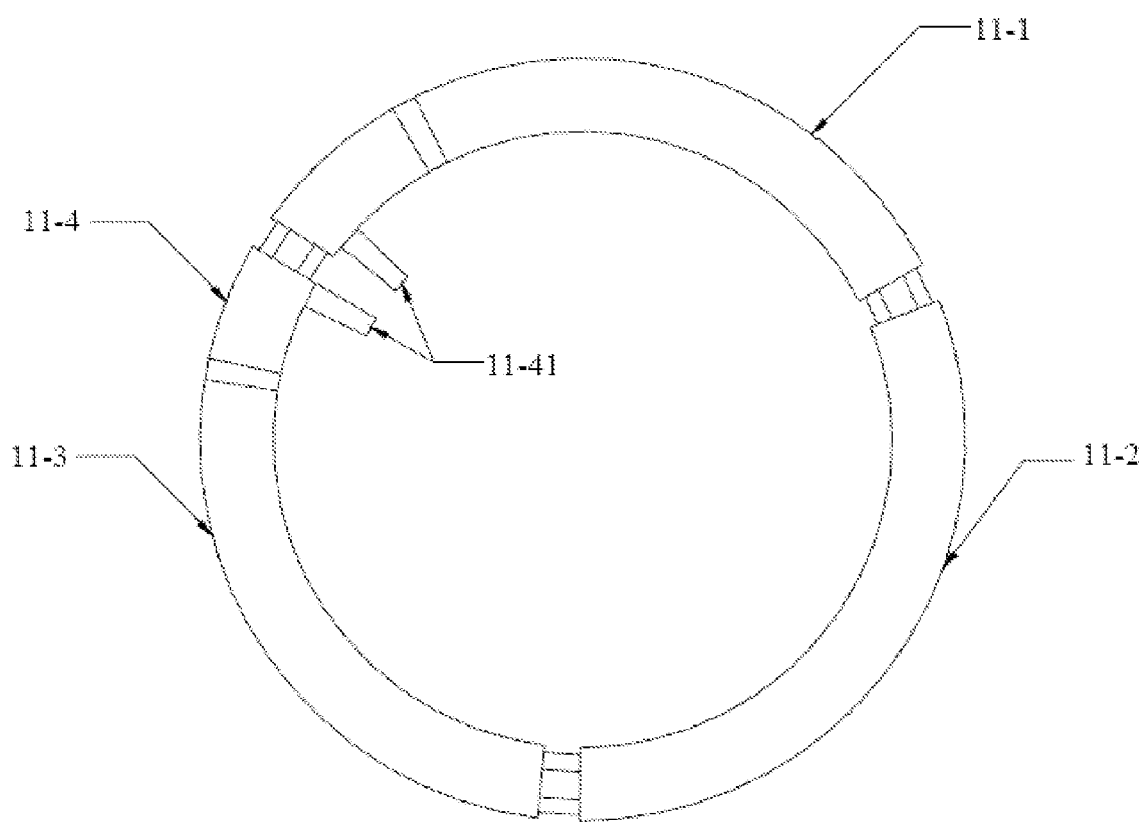
FIG. 12 is a schematic view of another example of an illumination device (a ring-shaped lamp tube) constituted by the tube elementary LED according to the second embodiment.

FIG. 12 is a schematic view of another example of an illumination device (a ring-shaped lamp tube) constituted by the tube elementary LED according to the second embodiment.

As shown in FIG. 12, the ring-shaped lamp tube comprises three tube elementary LEDs 11-1 to 11-3 according to the second embodiment. One end of the arc-shaped tube elementary LED 11-1 and one end of the arc-shaped tube elementary 11-3 in the ring-shaped lamp tube are plugged into the adapter plug 11-4, and an end 11-41 of the adapter plug in FIG. 12, which is exposed to outside, can be plugged into the socket of the lamp support (not shown).

It would be understood by the person skilled in the art that the ring-shaped lamp tube can comprises any desired number of the arc-shaped tube elementary LEDs according to the second embodiment. Depend on the dimensions of the arc-shaped tube elementary LED, the ring-shaped lamp tube can be made to be compatible with existing fluorescent lamp support.

Therefore, the lamp tube comprising a plurality of the tube elementary LEDs has a good compatibility with the conventional lamp. Moreover, from the above description, the person skilled in the art would understand that it is convenient to make lamp tubes of various shapes by employing the tube elementary LEDs of various shapes according to the present application. For example, a lamp tube of any shape in the prior art can be fabricated by connecting the tube elementary LED according to the first embodiment, the tube elementary LED according to the second embodiment and the tube elementary LED of other shape, and for example, a spiral lamp tube, a U-shaped lamp tube and a butterfly lamp tube each can be made by the tube elementary LED. Moreover, an elliptical ring-shaped lamp tube, a polygonal lamp tube etc. may be fabricated.

From the description of the third and the fourth embodiments, it would be understood by the person skilled in the art that the adapter plug not only can make the illumination device to be assembled onto the lamp support, but also, when plugs and sockets of the plurality of the tube elementary LEDs do not match with each other, the adapter plug can be used to make the tube elementary LEDs with these unmatched plugs and sockets to connect to each other.

Fifth Embodiment

The present application can also be implemented as a tube LED which cannot act as an element. That is, only one end of the tube LED is provided with a power plug or a power socket, thus the tube LED cannot be plugged into another tube LED. Apart from this, the other structures of the tube LED is the same as those of the tube elementary LEDs according to the first and second embodiments.

The embodiments mentioned above are merely illustrative, and various modifications and variations can be made without departing from the spirit of the present application.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A tube elementary light-emitting diode ("LED") comprising:
    an elementary glass tube, through which light can be transmitted, the elementary glass tube comprising two sealed ends with a power plug and a power socket, respectively;
    at least one LED light emitting base plate disposed in the elementary glass tube that is powered by the power plug and the power socket, wherein a plurality of LED chips for emitting light are mounted on one surface of the LED light emitting base plate, wherein bodies of the LED chips are made from microcrystalline LED chips, and PN junctions of the LED chips are first connected in series respectively and then connected in parallel by leads to form an anode lead terminal and a cathode lead terminal, further wherein the LED light emitting base plate is shaped as a strip with a combination of two phosphors with broadband emissions;
    a plurality of affixing supports affixing the at least one LED light emitting base plate in an internal chamber of the elementary glass tube, wherein the plurality of affixing supports are made of metal; and
    a reflector attached on the elementary glass tube reflects light emitted from the at least one LED light emitting base plate to outside of the elementary glass tube;
    wherein, the PN junctions of the LED chips contact with the reflector at a plurality of points through the plurality of affixing supports.

2. The tube elementary LED as in claim 1, wherein the elementary glass tube is one of a polycrystalline alumina tube, a quartz glass tube, a Vycor glass tube, a borosilicate glass tube, a microcrystalline glass tube and an ordinary soda lime glass tube.

3. The tube elementary LED as in claim 1, wherein the power plug and the power socket are complimentary to each other, such that two or more of the tube elementary LEDs are connected to each other through the power plug and the power socket.

4. The tube elementary LED as in claim 3, wherein the power plug and the power socket are pin plug and pin socket complimentary to each other.

5. The tube elementary LED as in claim 1, wherein the elementary glass tube has a diameter in the range of 0.5 mm-26.5 mm, a wall thickness in the range of 0.15 mm-1.5 mm, and a length in the range of 7 mm-480 mm.

6. The tube elementary LED as in claim 4, wherein the LED light emitting base plate has a length in the range of 6 mm-470 mm, a width in the range of 0.25 mm-24 mm, and a thickness in the range of 0.1 mm-1.5 mm.

7. The tube elementary LED as in claim 1, wherein the LED light emitting base plate is made of a semitransparent polycrystalline alumina plate or a quartz glass plate.

8. The tube elementary LED as in claim 1, wherein the microcrystalline LED chips have a diameter in the range of 10 μm-50 μm.

9. The tube elementary LED as in claim 1, wherein the reflector is a film type metal reflector coated on the tube wall of the elementary glass tube, or a plate type metal reflector embedded on the internal surface or the external surface of the tube wall of the elementary glass tube, or the reflector is a dielectric film.

10. The tube elementary LED as in claim 9, wherein the metal reflector is made of aluminum, the dielectric film is made of magnesium fluoride with either zinc sulfide or silicon monoxide.

11. The tube elementary LED as in claim 1, wherein approximately half of the elementary glass tube is attached with the reflector.

12. The tube elementary LED as in claim 1, wherein the reflector comprises two comb-like metal parts which are inserted into each other and are electrically insulated from each other.

13. The tube elementary LED as in claim 1, wherein the at least one LED light emitting base plate comprises two LED light emitting base plates.

14. The tube elementary LED as in claim 13, wherein the two LED light emitting base plates are disposed symmetrically along an axis of the elementary glass tube, and an angle between two planes, which respectively extend from two surfaces of the two LED light emitting base plates on which LED chips are mounted, is higher than 90 degrees.

15. The tube elementary LED as in claim 1, wherein the at least one LED light emitting base plate comprises three LED light emitting base plates.

16. The tube elementary LED as in claim 15, wherein respective planes of the three LED light emitting base plates are intersected to form a triangular prism, and respective surfaces of the three LED light emitting base plates, on which LED chips are mounted, are external surfaces of the triangular prism.

17. The tube elementary LED as in claim 15, wherein two of the LED light emitting base plates are symmetrical with respect to the plane of the third LED light emitting base plate.

18. The tube elementary LED as in claim 1, wherein the plurality of fixing supports are made of surface-polished aluminum.

19. The tube elementary LED as in claim 1, wherein the elementary glass tube is filled with dry nitrogen or an inert gas at a pressure in a range of 100 Torr-3 atm.

* * * * *